United States Patent
Inami

(10) Patent No.: US 6,179,005 B1
(45) Date of Patent: Jan. 30, 2001

(54) SPOOL VALVE TYPE ELECTROMAGNETIC VALVE

(75) Inventor: Madoka Inami, Kariya (JP)

(73) Assignee: Aisin Seiki Kabushiki Kaisha, Kariya (JP)

(*) Notice: Under 35 U.S.C. 154(b), the term of this patent shall be extended for 0 days.

(21) Appl. No.: 09/425,687

(22) Filed: Oct. 22, 1999

(30) Foreign Application Priority Data

Oct. 22, 1998 (JP) ................................. 10-302600

(51) Int. Cl.[7] ................................. F15B 13/044
(52) U.S. Cl. ................................. 137/625.65; 251/129.08
(58) Field of Search .................. 137/625.65; 251/129.08

(56) References Cited

U.S. PATENT DOCUMENTS 4,971,116 * 11/1990 Suzuki et al. .................... 137/625.65

FOREIGN PATENT DOCUMENTS 7-301346  11/1995 (JP).

* cited by examiner

Primary Examiner—Gerald A. Michalsky
(74) Attorney, Agent, or Firm—Burns, Doane, Swecker & Mathis, LLP

(57) ABSTRACT

A spool valve type electromagnetic valve constructed to facilitate production at reduced cost includes a linear solenoid having a spool and a plunger that are coaxially aligned. The linear solenoid also has a rear yoke which is configured by a resin-made bobbin around which a coil is wound and a plunger movably fitted in the resin made bobbin. The linear solenoid also includes a front yoke positioned in the bobbin in coaxial alignment with both the rear yoke and a connecting end of a valve body of the valve. The front yoke, the rear yoke and the resin-made bobbin form an integrated structure produced through insert molding. An alignment facilitating portion is provided between the front yoke and the valve body.

12 Claims, 2 Drawing Sheets

SPOOL VALVE TYPE ELECTROMAGNETIC VALVE

Figure 1:
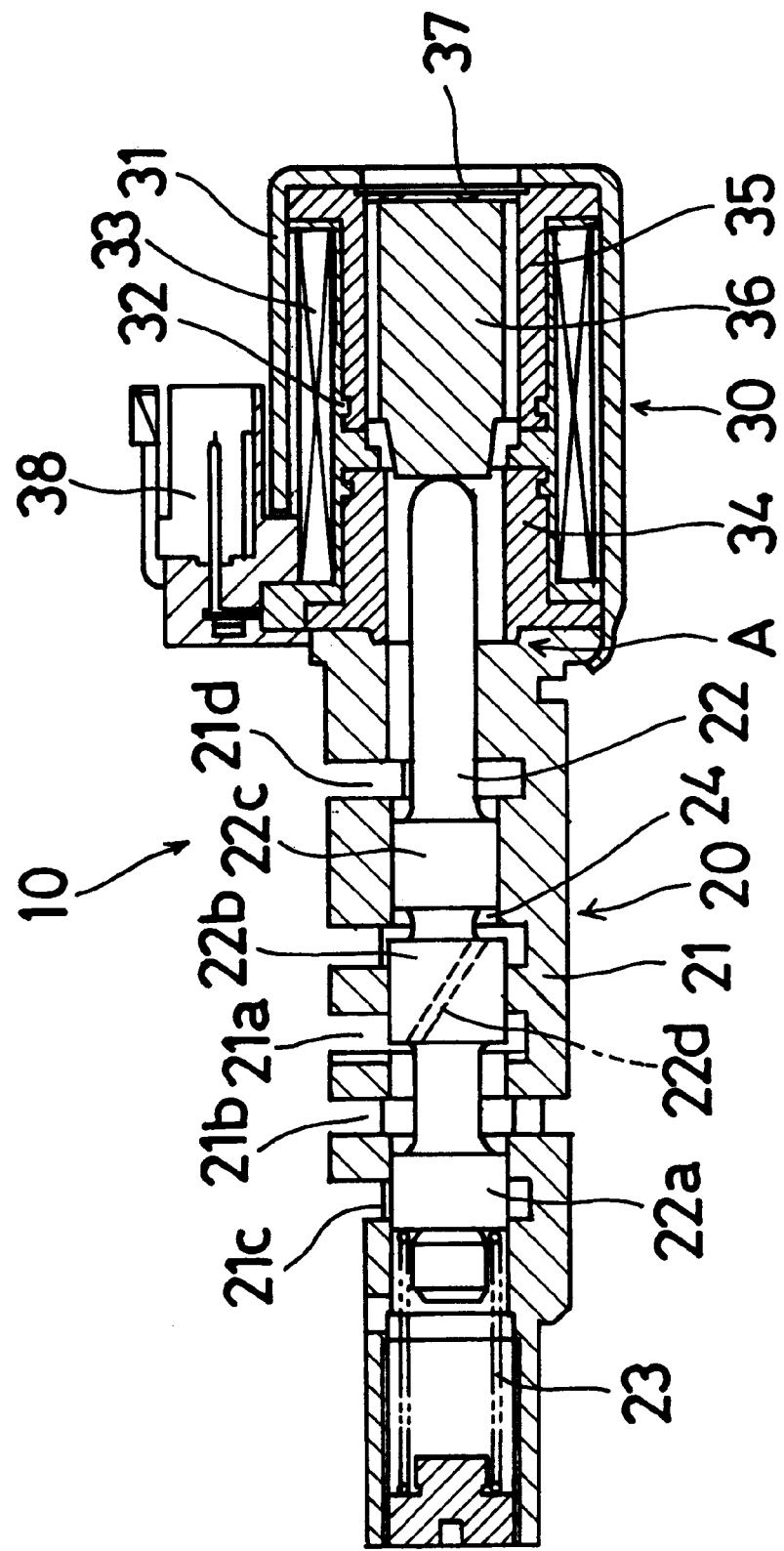

This application is based on and claims priority under 35 U.S.C. § 119 with respect to Japanese Application No. 10(1998)-302600 filed on Oct. 23, 1998, the entire content of which is incorporated herein by reference.

FIELD OF THE INVENTION

The present invention generally relates to a flow control or pressure control valve. More particularly, the present invention pertains to a spool valve type electromagnetic valve used for controlling flow or pressure.

BACKGROUND OF THE INVENTION

A conventional electromagnetic valve used for flow controlling or pressure controlling includes a valve body having an inlet port, an outlet port and a drain port. A spool is fitted in the valve body in a slidable manner and is adapted to be operated in such a manner that the spool is in a counter balanced state by being applied with an output force of a linear solenoid and the urging force of a spring, the hydraulic pressure at the output port, or the sum of the hydraulic pressure at the output port and the urging force of the spring. An electromagnetic valve of this type is disclosed in Japanese Patent Laid-Open Publication No. Hei.7-301346 published without examination in 1995.

With this type of electromagnetic valve, to obtain the designed performance of the valve, smooth movements of the spool and a plunger from which the output force of the linear solenoid is derived are necessary and are established subject to coaxial alignment between the spool and the plunger. To realize this coaxial alignment in the known electromagnetic valve, an alignment engaging portion is provided between a casing of the linear solenoid and the valve body.

However, with this construction, a higher dimensional precision is required for the casing and the related parts or elements by which the plunger is aligned with the casing. This need for precision makes it difficult to reduce the production costs associated with known electromagnetic valve constructions.

In addition, to avoid direct engagement of the plunger with a yoke when electric current flowing through the coil of the linear solenoid reaches its maximum value, a stopper member formed from non-magnetic material is provided between the plunger and yoke. This also contributes to making it difficult to reduce the production cost associated with the known electromagnetic valve constructions.

In light of the foregoing, a need exists for a spool valve type electromagnetic valve which is not as susceptible to the aforementioned disadvantages and drawbacks.

It would thus be desirable to provide a spool valve type electromagnetic valve having a coaxially aligned spool and plunger that is capable of being manufactured at a lower cost.

SUMMARY OF THE INVENTION

According to one aspect of the invention, a spool valve type electromagnetic valve includes a linear solenoid, a valve body provided with a bore and having a connecting end that is connected to the linear solenoid, and a spool fitted in the bore for sliding movement. The valve body includes an inlet port, an outlet port and a drain port, with the inlet port, the outlet port, and the drain port being in fluid communication with the bore. The spool is urged in one direction by a spring which applies an urging force to the spool and is in a counter balanced condition by the output force of the linear solenoid and the urging force of the spring. The spool is moved to effect an inverse proportional control of the opening area of a passage extending from the inlet port to the outlet port relative to an opening area of a passage extending from the outlet port to the drain port. The linear solenoid includes a resin-made bobbin, a rear yoke around which a coil is wound, a plunger movably fitted in the rear yoke, and a front yoke positioned in the resin-made bobbin in coaxial alignment with both the rear yoke and the connecting end of the valve body. The front yoke, the rear yoke and the resin-made bobbin form an insert molded integrated structure, and an alignment facilitating portion is provided between the front yoke and the valve body.

According to another aspect of the invention, a spool valve type electromagnetic valve includes a linear solenoid, a valve body provided with a bore and having a connecting end that is connected to the linear solenoid, and a spool slidably positioned within the bore and urged in one direction by an urging member. The valve body possesses an inlet port, an outlet port and a drain port, with the inlet port, the outlet port, and the drain port being in fluid communication with the bore. The spool is movable to control the opening area of a passage extending from the inlet port to the outlet port and the opening area of a passage extending from the outlet port to the drain port. The linear solenoid includes a rear yoke, a resin-made bobbin around which a coil is wound, a plunger movably fitted in the resin-made bobbin, and a front yoke positioned in the resin-made bobbin in coaxial alignment with both the rear yoke and the connecting end of the valve body. The resin-made bobbin possesses engaging portions that engage engaging portions of the front yoke and the rear yoke to form an integrated structure between the front yoke, the rear yoke and the resin-made bobbin.

In accordance with another aspect of the invention, a spool valve type electromagnetic valve includes a linear solenoid, a valve body provided with a bore and having a connecting end that is connected to the linear solenoid, and a spool slidably positioned within the bore and urged in one direction by an urging member. The valve body includes an inlet port, an outlet port and a drain port that are in fluid communication with the bore. The spool is movable to control the opening area of a passage extending from the inlet port to the outlet port and the opening area of a passage extending from the outlet port to the drain port. The linear solenoid includes a rear yoke, a bobbin around which a coil is wound, a plunger movably fitted in the bobbin, a front yoke positioned in the bobbin in coaxial alignment with both the rear yoke and the connecting end of the valve body, and a stopper member integrally formed in one piece and at the same time with the bobbin for regulating sliding movement of the plunger toward the front yoke. The stopper member extends radially inwardly to be contacted by the plunger.

BRIEF DESCRIPTION OF THE DRAWING FIGURES

Figure 2:
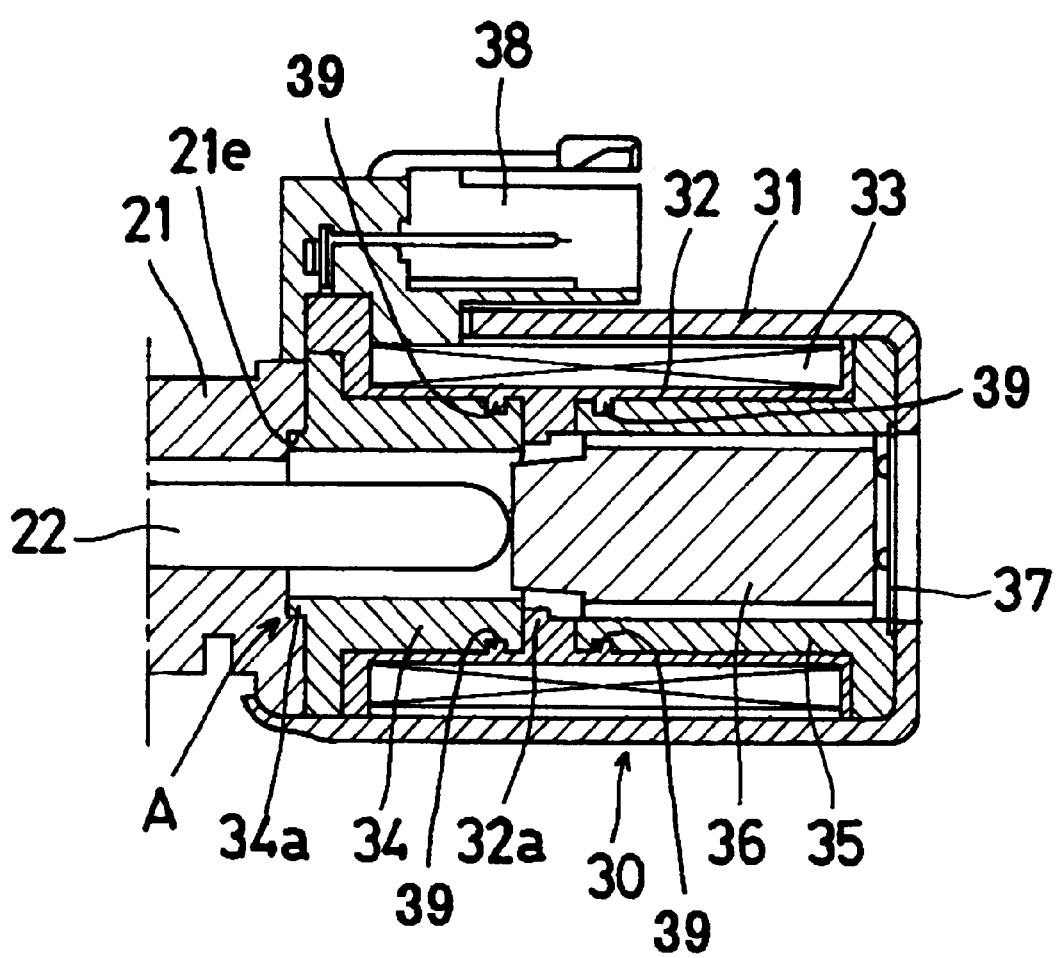

The foregoing and additional features of the present invention will become more apparent from the following detailed description considered with reference to the accompanying drawing figures in which like elements are designated by like reference numerals and wherein:

FIG. 1 is a cross-sectional view of a spool valve type electromagnetic valve in accordance with an embodiment of the present invention; and FIG. 2 is an enlarged cross-sectional view of a portion of the spool valve type electromagnetic valve shown in FIG. 1.

DETAILED DESCRIPTION OF THE INVENTION

FIGS. 1 and 2 schematically illustrate a spool valve type electromagnetic valve 10 which, by way of example, is adapted to be used to effect pressure control. The spool valve type electromagnetic valve 10, referred to hereinafter as a valve, includes a spool valve portion or division 20 and a linear solenoid portion or division 30.

The spool valve portion 20 includes a valve body 21 in which is formed a bore, a spool 22 slidably fitted in the bore of the valve body for sliding axial movement, and a spring 23 urging or biasing the spool 22 toward the linear solenoid portion 30. The valve body 21 is provided with several ports, including an inlet port 21a to which a fluid under pressure is supplied from a hydraulic source, an outlet port 21b which is in fluid communication with a hydraulic actuator, a drain port 21c which is in fluid communication with a reservoir, and a communication port 21d which is also in fluid communication with the reservoir. The spool 22 is formed with a pair of axially spaced apart larger-radius lands 22a, 22b and a smaller-radius land 22c. The larger-radius lands 22a, 22b possess an outer diameter that is greater than the outer diameter of the smaller-radius land 22c. Also, the lands 22a, 22b, 22c are arranged so that one of the larger-radius lands 22b is positioned between the other larger-radius land 22a and the smaller-radius land 22c. A fluid passage 22d passes through the intermediately positioned land 22b to establish a continual fluid communication between the outlet port 21b and a hydraulic pressure chamber 24 defined between the larger-radius land 22b and the smaller-radius land 22c.

The linear solenoid portion 30 of the valve has a casing 31 formed of a magnetic metal, a bobbin 32 formed of a nonmagnetic material or resin, a coil 33 wound on the bobbin 32, a front yoke 34 formed of a magnetic metal and positioned within the bobbin 32, a rear yoke 35 formed of a magnetic material and positioned in the bobbin 32, a plunger 36 formed of a magnetic material and slidably fitted in the rear yoke 35, a stopper 37 formed of nonmagnetic material, and a connector 38 provided outside the casing 31.

The bobbin 32, the front yoke 34, and the rear yoke 35 are formed as an integrated unit by way of an insert molding method. During the molding process, the front yoke 34 and the rear yoke 35 are brought into co-axial alignment. As illustrated in FIGS. 1 and 2, engaging portions of the bobbin 32 (e.g., radially inwardly facing portions of the bobbin 32) and engaging portions of the front and rear yokes 34, 35 (e.g., radially outwardly facing portions of the front and rear yokes 35) engage one another to form the integrated structure. These engaging positions are generally designated by reference number "39" in FIG. 2.

As best seen in FIG. 2, the bobbin 32 is provided with a stopper 32a that is integral with the bobbin 32 and formed in one piece at the same time with the bobbin 32. The stopper 32a extends radially inwardly and terminates in a gap formed between the opposing facing ends of the front and rear yokes 34, 35. The stopper 32a of the bobbin 32 is adapted to interrupt a magnetic association between the opposing facing ends of the respective yokes 34, 35 and define a limit position of the plunger 36 to prevent engagement of the plunger 36 with the front yoke 34 when the plunger 36 is moved toward the front yoke 34 by an attraction magnetic force resulting from energization of the coil 33.

An alignment facilitating portion A is provided between the front yoke 34 and the valve body 21 for purposes of establishing a coaxial alignment between the spool 22 and the plunger 36 subsequent to the coaxial alignment of the spool 22, the front yoke 34, and the rear yoke 35. This alignment facilitating portion A is constituted by an axial end portion 34a of the front yoke 34 and a stepped shoulder 21e formed on the connecting end of the valve body 21. The axial end portion 34a of the front yoke 34 extends axially towards the connecting end of the valve body 21 and engages the shoulder 21e which is defined by an enlarged inner diameter portion of the connecting end of the valve body 21.

When the coil 33 of the linear solenoid portion 30 is not energized against the pressure of the fluid in the chamber 24, as illustrated in FIG. 1, the spring 23 urges the spool 22 and the plunger 36 in the rightward direction. The distal end of the spool 22 (i.e., the right side end as seen with reference to FIG. 1) is thus in continual engagement with the left end of the plunger 36. At the same time, the right end of the plunger is in engagement with the stopper 37. Under the illustrated condition in FIG. 1, the fluid passage area extending from the inlet port 21a to the outlet port 21b is at a maximum value, with the hydraulic pressure at the outlet port 21b being equal to that at the inlet port 21a. At the same time, the flow passage area associated with the drain port 21c and extending from the outlet port 21b to the drain port 21c is at a minimum value indicative of the interrupted state.

When the coil 33 of the linear solenoid portion 30 is energized, a magnetic flux flows from the rear yoke 35 to the front yoke 34 through the plunger 36. This causes an attraction of the plunger 36 toward the front yoke 34, thereby moving the plunger 36 and the spool 22 in the leftward direction in FIG. 1. As the spool 22 moves axially, the area of the flow passage from the inlet port 21a to the outlet port 21b decreases, while the area of the flow passage from the outlet port 21b to the drain port 21c increases. The spool 22 and the plunger 36 are thus moved to a position at which the urging force of the spring 23 is balanced with the sum of the attraction force applied to the plunger 36 and the hydraulic pressure in the chamber 24, whereby the hydraulic pressure at the outlet port 21b is lowered to a value which corresponds to the attraction force applied to the plunger 36. By virtue of the fact that the attraction force applied to the plunger 36 is proportional to the amount of electric current passing through the coil 33, the hydraulic pressure at the outlet port 21b can be controlled by adjusting the amount of electric current passing through the coil 33.

Of course, it is to be understood that the instead of the illustrative spool valve type electromagnetic valve, the present invention is also applicable to a similar device for effecting flow control.

According to the present invention, the spool valve type electromagnetic valve is advantageously constructed in a way that allows realization of cost reduction manufacturing. The linear solenoid has a rear yoke, a bobbin (e.g., a resin-made bobbin) around which the coil is wound, a plunger slidably fitted in the rear yoke, and a front yoke positioned in the bobbin in coaxial alignment with both the rear yoke and the connecting end of the valve body. The front yoke, the rear yoke, and the bobbin form an integrated structure produced through insert molding, and an alignment facilitating portion is provided between the front yoke and the valve body. Thus, coaxial alignment between the spool and the plunger is correctly established without the need for producing other high precision related elements or components, including the case of the linear solenoid. It is thus possible to lower the production cost associated with the spool valve type electromagnetic valve.

In addition, the stopper member for preventing excessive movement of the plunger toward the front yoke is formed integrally and in one piece with the bobbin, thus enabling realization of a cost reduction for manufacturing the spool valve type electromagnetic valve as compared to other valves of this type in which the stopper member is separate from the bobbin before the spool valve type electromagnetic valve is assembled.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A spool valve type electromagnetic valve comprising:
   a linear solenoid;
   a valve body provided with a bore and having a connecting end that is connected to the linear solenoid, said valve body including an inlet port, an outlet port and a drain port that are in fluid communication with the bore;
   a spool fitted in the bore for sliding movement, said spool being urged in one direction by a spring which applies an urging force to the spool, said spool being in a counter balanced condition by an output force of the linear solenoid and an urging force of the spring, the spool being moved to effect an inverse proportional control of an opening area of a passage extending from the inlet port to the outlet port relative to an opening area of a passage extending from the outlet port to the drain port;
   said linear solenoid comprising a resin-made bobbin, a rear yoke around which a coil is wound, a plunger movably fitted in the rear yoke, a front yoke positioned in the resin-made bobbin in coaxial alignment with both the rear yoke and the connecting end of the valve body, the front yoke, the rear yoke and the resin-made bobbin forming an insert molded integrated structure, and an alignment facilitating portion provided between the front yoke and the valve body.

2. The spool valve type electromagnetic valve as set forth in claim 1, including a stopper member for regulating sliding movement of the plunger toward the front yoke, the stopper member being formed integrally in one piece with the resin-made bobbin, the stopper member extending radially inwardly and terminating between opposing ends of the front yoke and the rear yoke.

3. The spool valve type electromagnetic valve as set forth in claim 1, wherein the rear yoke, the front yoke and the bobbin are positioned within a solenoid case.

4. A spool valve type electromagnetic valve comprising:
   a linear solenoid;
   a valve body provided with a bore and having a connecting end that is connected to the linear solenoid, said valve body including an inlet port, an outlet port and a drain port, the inlet port, the outlet port, and the drain port being in fluid communication with the bore;
   a spool slidably positioned within the bore and urged in one direction by an urging member, the spool being movable to control an opening area of a passage extending from the inlet port to the outlet port and an opening area of a passage extending from the outlet port to the drain port;
   said linear solenoid comprising a rear yoke, a resin-made bobbin around which a coil is wound, a plunger movably fitted in the resin-made bobbin, and a front yoke positioned in the resin-made bobbin in coaxial alignment with both the rear yoke and the connecting end of the valve body, the resin-made bobbin possessing engaging portions that engage engaging portions of the front yoke and the rear yoke to form an integrated structure between the front yoke, the rear yoke and the resin-made bobbin.

5. The spool valve type electromagnetic valve as set forth in claim 4, including an alignment facilitating portion provided between the front yoke and the valve body to facilitate coaxial alignment between the between the front yoke and the valve body.

6. The spool valve type electromagnetic valve as set forth in claim 4, including a stopper member for regulating sliding movement of the plunger toward the front yoke, the stopper member being formed integrally in one piece with the resin-made bobbin, the stopper member extending radially inwardly and terminating between opposing ends of the front yoke and the rear yoke.

7. The spool valve type electromagnetic valve as set forth in claim 4, wherein the rear yoke, the front yoke and the bobbin are positioned within a solenoid case.

8. A spool valve type electromagnetic valve comprising:
   a linear solenoid;
   a valve body provided with a bore and having a connecting end that is connected to the linear solenoid, said valve body including an inlet port, an outlet port and a drain port that are in fluid communication with the bore;
   a spool slidably positioned within the bore and urged in one direction by an urging member, the spool being movable to control an opening area of a passage extending from the inlet port to the outlet port and an opening area of a passage extending from the outlet port to the drain port;
   said linear solenoid comprising a rear yoke, a bobbin around which a coil is wound, a plunger movably fitted in the bobbin, a front yoke positioned in the bobbin in coaxial alignment with both the rear yoke and the connecting end of the valve body, and a stopper member integrally formed in one piece and at the same time with the bobbin for regulating sliding movement of the plunger toward the front yoke, the stopper member extending radially inwardly to be contacted by the plunger to limit movement of the plunger.

9. The spool valve type electromagnetic valve as set forth in claim 8, wherein the front yoke and rear yoke include spaced apart opposing ends, said stopper member extending between the opposing ends of the front yoke and the rear yoke.

10. The spool valve type electromagnetic valve as set forth in claim 8, including an alignment facilitating portion provided between the front yoke and the valve body to facilitate coaxial alignment between the between the front yoke and the valve body.

11. The spool valve type electromagnetic valve as set forth in claim 10, wherein the alignment facilitating portion includes an axially extending end portion of the front yoke that engages a stepped shoulder provided at an axial end of the connecting end of the valve body.

12. The spool valve type electromagnetic valve as set forth in claim 8, wherein the rear yoke, the front yoke and the bobbin are positioned within a solenoid case.

* * * * *

UNITED STATES PATENT AND TRADEMARK OFFICE
CERTIFICATE OF CORRECTION

PATENT NO. : 6,179,005 B1
DATED : January 30, 2001
INVENTOR(S) : M. Inami

Page 1 of 1

It is certified that error appears in the above-identified patent and that said Letters Patent is hereby corrected as shown below:

On title page, item

(30) Foreign Application Priority Data

Oct. 23, 1998 (JP) ...........................10-302600

On title page, item

(30) Foreign Application Priority Data

Oct. 23, 1998 (JP) ...........................10-302600

Signed and Sealed this

Twelfth Day of June, 2001

*Attest:*

Nicholas P. Godici

NICHOLAS P. GODICI
*Attesting Officer*    *Acting Director of the United States Patent and Trademark Office*